(12) United States Patent
Makulec et al.

(10) Patent No.: US 8,899,910 B2
(45) Date of Patent: Dec. 2, 2014

(54) AIR TURBINE STARTER AND METHOD FOR VENTING WITHOUT LOSS OF OIL

(75) Inventors: Jeffrey M. Makulec, Rockford, IL (US); Marc Westen, Hartford, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 671 days.

(21) Appl. No.: 13/218,635

(22) Filed: Aug. 26, 2011

(65) Prior Publication Data

US 2013/0051975 A1 Feb. 28, 2013

(51) Int. Cl.
*F01D 25/18* (2006.01)
*F02C 7/277* (2006.01)

(52) U.S. Cl.
CPC ............... *F02C 7/277* (2013.01); *F01D 25/18* (2013.01); *F05D 2260/4023* (2013.01); *F05D 2260/602* (2013.01); *F05D 2260/605* (2013.01)
USPC .............................................. 415/1; 184/6.11

(58) Field of Classification Search
USPC ............... 415/1, 110, 112, 115, 216.1, 229; 184/6.11, 6.12
See application file for complete search history.

(56) References Cited

U.S. PATENT DOCUMENTS

| | | | | | |
|---|---|---|---|---|---|
| 2,702,093 | A | * | 2/1955 | Sherrill | 184/6.26 |
| 3,347,553 | A | * | 10/1967 | Schweiger | 277/388 |
| 4,131,188 | A | * | 12/1978 | Charchian | 192/113.32 |
| 4,209,205 | A | * | 6/1980 | Gregg et al. | 305/119 |
| 4,265,334 | A | * | 5/1981 | Benhase, Jr. | 184/6.11 |
| 5,119,905 | A | * | 6/1992 | Murray | 184/6.11 |
| 5,246,352 | A | * | 9/1993 | Kawakami | 417/407 |
| 5,267,433 | A | * | 12/1993 | Burch | 60/788 |

* cited by examiner

*Primary Examiner* — Edward Look
*Assistant Examiner* — Aaron R Eastman
(74) *Attorney, Agent, or Firm* — Kinney & Lange, P.A.

(57) ABSTRACT

A clutch assembly includes a shaft, vent plug and oil guide sleeve. The shaft includes an internal cavity, first passages for allowing oil to lubricate clutch components, and second passages for allowing excess oil to drain from the internal cavity. The vent plug has a radial passage in communication with the internal cavity for venting the cavity with an external source of air. The oil guide sleeve directs oil into the internal cavity. A method for lubricating and venting an air turbine starter includes delivering lubricating oil to an internal cavity of a clutch via an oil guide sleeve. The oil guide sleeve prevents oil from exiting the cavity through excess oil drainage passages before it lubricates the clutch components. The method also includes draining excess oil from the cavity through excess oil drainage passages so that excess oil does not substantially impede air flow through a vent plug passage.

20 Claims, 5 Drawing Sheets

AIR TURBINE STARTER AND METHOD FOR VENTING WITHOUT LOSS OF OIL

STATEMENT OF GOVERNMENT INTEREST

This invention was made with government support under Contract No. N00019-06-C-0081 awarded by the United States Navy. The government has certain rights in the invention.

BACKGROUND

Air-start systems are power sources used to provide the initial rotation to start large diesel and gas turbine engines. Air turbine starters are one example of an air-start system used on aircraft having a gas turbine engine. Gas turbine engines typically have at least one spool that includes a compressor and a turbine. When a gas turbine engine is burning fuel and operating, the spool rotates at a high speed without further assistance. However, when a gas turbine engine is initially started, the spool typically needs assistance to begin rotation. Various starters have been devised to initiate rotation of the spool.

In some gas turbine engines (for both aircraft and ground-based operations), an air turbine starter is used to start spool rotation. An air turbine starter typically includes a radial inward flow turbine, or axial flow turbine, which is connected to the high pressure compressor spool of the gas turbine engine through an accessory gearbox, in addition to various piping, valves and gears. Compressed air is blown over the turbine of the air turbine starter, which in turn causes the spool to rotate and start the gas turbine engine. Compressed air is provided to the air turbine starter by bleed air from an aircraft's auxiliary power unit (APU) or another engine on the aircraft or from an air compressor on the ground. Once the air turbine starter provides initial rotation to the high pressure compressor of the gas turbine engine, the gas turbine engine can be started and run on fuel. In addition to providing initial rotation for a gas turbine engine, air turbine starters can also be used for maintenance operations (engine washing, circulating oil during oil fill, etc.).

Gas turbine engines typically include various components, such as gears, shafts and bearings, which benefit from lubrication and cooling. An oil supply system supplies oil, or another lubricating liquid, to and from the components to lubricate and cool the components.

SUMMARY

A clutch assembly includes a shaft, a vent plug and an oil guide sleeve. The shaft includes an internal cavity, first passages in the shaft for allowing oil to exit the internal cavity to lubricate clutch components and a second passage in the shaft for allowing excess oil to drain from the internal cavity. The vent plug has a radial passage in communication with the internal cavity of the shaft for venting the internal cavity with a source of air external to the internal cavity. The oil guide sleeve directs oil into the internal cavity.

An air turbine starter includes a clutch, an oil nozzle, a vent plug, an output shaft assembly engaged with the clutch and an oil guide sleeve. The clutch includes a shaft, bearings, an internal cavity disposed within the shaft, first passages in the shaft for allowing oil to exit the internal cavity to lubricate air turbine starter components and second passages in the shaft for allowing excess oil to drain from the internal cavity of the clutch. The oil nozzle is in communication with the internal cavity. The vent plug has a radial passage. The output shaft assembly includes an output shaft and a vent outlet. The vent outlet is in communication with the vent plug for venting the internal cavity of the clutch with a source of air external to the internal cavity. The oil guide sleeve directs oil delivered by the oil nozzle to the clutch shaft.

A method for lubricating and venting an air turbine starter includes delivering lubricating oil to an internal cavity of a clutch via an oil guide sleeve to lubricate clutch components. The oil guide sleeve prevents oil from exiting the internal cavity through excess oil drainage passages before it lubricates the clutch components. The method also includes draining excess oil from the internal cavity through the excess oil drainage passages so that excess oil does not substantially impede air flow through a vent plug passage. The excess oil drainage passages are positioned so that at least a portion of each passage is radially outward of a radial passage of the vent plug.

DETAILED DESCRIPTION

The present invention provides an air turbine starter and a method for lubricating and venting the air turbine starter without loss of oil. Excess oil drainage passages in a clutch shaft and an oil guide sleeve prevent build up of excessive amounts of oil within an internal cavity of the air turbine starter, reducing or eliminating the chance that the excess oil prevents proper venting and causes oil to leak from the air turbine starter.

Figure 1:
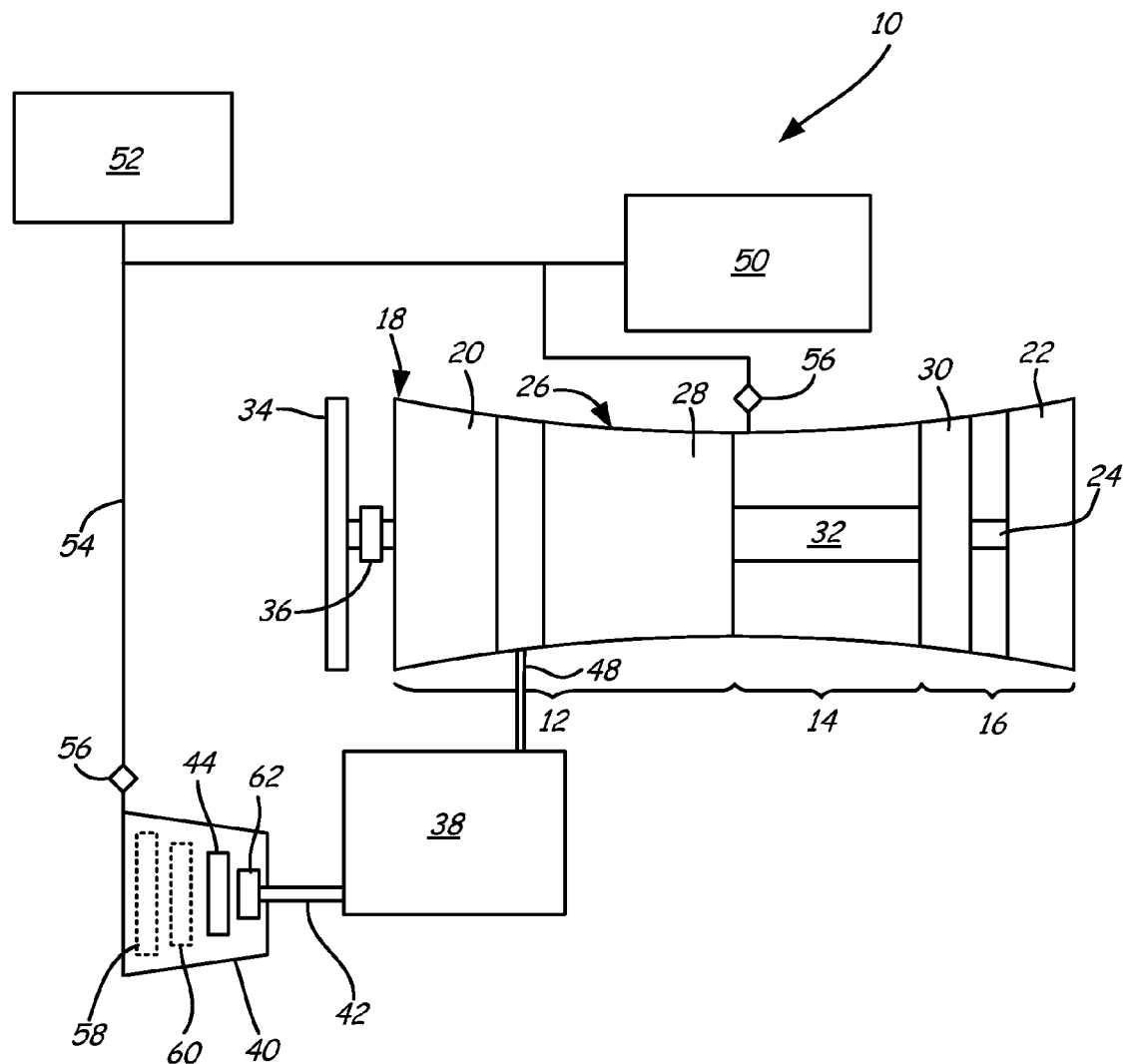
FIG. 1 is a schematic view of an air turbine starter connected to a gas turbine engine.

FIG. 1 illustrates a schematic view of one embodiment of an air turbine starter connected to a gas turbine engine. Gas turbine engine 10 includes main compressor section 12, main combustor section 14, and main turbine section 16. Low pressure spool 18 (which includes low pressure compressor 20 and low pressure turbine 22 connected by low pressure shaft 24) and high pressure spool 26 (which includes high pressure compressor 28 and high pressure turbine 30 connected by high pressure shaft 32) each extend from main compressor section 12 to main turbine section 16. Propulsion fan 34 is connected to and driven by low pressure spool 18. A fan drive gear system 36 may be included between the propulsion fan 34 and low pressure spool 18. Air flows from main compressor section 12 to main turbine section 16 along the engine gas flow path. The general construction and operation of gas turbine engines is well-known in the art, and therefore further discussion here is unnecessary.

Air turbine starter 40 is connected to gas turbine engine 10 through gearbox 38. Output shaft 42 connects air turbine starter 40 to gearbox 38. Clutch 44 is connected to output shaft 42 via gearing. Accessory gearbox 38 is connected to high pressure spool 26 by shaft 48. Clutch 44 selectively engages and disengages with output shaft 42. In operation, air turbine starter 40 receives a compressed fluid, such as bleed air, from an air source, such as main compressor section 12, auxiliary power unit (APU) 50, or ground air cart or compressor 52. Air flows through air turbine starter gas flow path 54 to rotate air turbine starter 40, and consequently, rotate output shaft 42. When clutch 44 is engaged, air turbine starter 40 rotates output shaft 42, and consequently, rotates high pressure spool 26. Gas turbine engine 10 can, therefore, be started by using air turbine starter 40 to rotate high pressure spool 26 to a suitable speed before adding fuel to begin combustion in main combustor section 14. Once gas turbine engine 10 is operating normally, clutch 44 can be disengaged. Valves 56 can also be closed to reduce flow of air through air turbine starter gas flow path 54 and air turbine starter 40. As shown schematically in FIG. 1, air turbine starter 40 includes rotor 58, gear train 60, clutch 44 and output section 62.

Several components of air turbine starters 40 require lubrication to operate efficiently and effectively. These components include clutches, output shafts and bearings. In some air turbine starters 40, a predetermined amount of oil is added to the internal cavities of the starter. This predetermined amount of oil is meant to provide lubrication for the air turbine starter for a set number of flights, missions or operations or for the useful life of the air turbine starter. Depending on the size and components of the air turbine starter, different volumes of oil can be used. For example, one embodiment of an air turbine starter generally requires between about 250 mL and about 500 mL of oil to provide adequate lubrication of air turbine starter components.

Internal cavities within the air turbine starter are typically vented to prevent pressure build up or vacuum formation within the air turbine starter. Pressure build up and vacuums within the internal cavities of the air turbine starter can reduce the effectiveness or prevent air turbine starter from operating properly. The internal cavities of the air turbine starter are generally vented to an external air source. For example, in an air turbine starter on aircraft, the internal cavities are vented to an air turbine starter pad cavity, which communicates with overboard air. Venting the internal cavities of an air turbine starter can be difficult when lubricating oil is present in the cavities. First, oil present in the internal cavities can interfere with proper venting if the oil prevents the flow of air through venting passages. In certain situations, oil can block air flow into and out of the internal cavities of the air turbine starter. In these situations, components in the air turbine starter may be exposed to pressures beyond normal operating ranges. Second, oil that may find its way into the venting passages can be undesirably removed from the internal cavities by the flow of air. Removing lubricating oil from inside the air turbine starter reduces the amount of oil available for lubricating air turbine starter components. This can result in both oil leaking out of the air turbine starter and too little oil remaining within the air turbine starter to facilitate adequate lubrication.

Figure 2:
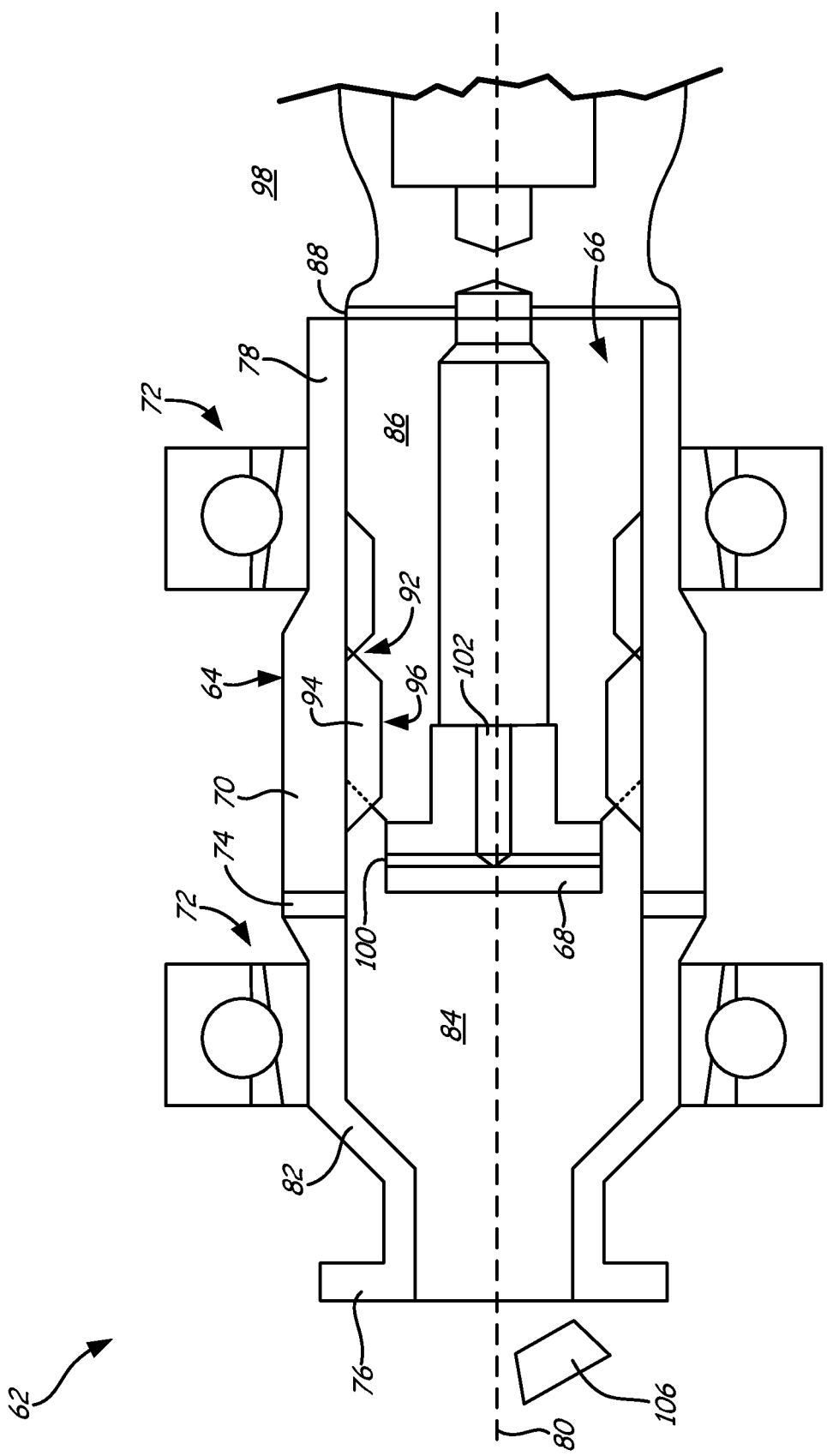
FIG. 2 is a cross-section view of the output section of an air turbine starter.

FIG. 2 illustrates a view of a cross-section of output section 62 of air turbine starter 40 without the features of the present invention. As shown in FIG. 2, components or air turbine starter 40 are annular having corresponding top and bottom representations of each cross-sectioned element described below unless noted otherwise. Output section 62 of air turbine starter 40 includes clutch assembly 64, output shaft assembly 66 and vent plug 68. Clutch assembly 64 is part of clutch 44 and includes clutch shaft 70, bearings 72 and clutch oil supply (first) passage 74. Clutch assembly 64 can also include other components such as additional bearings, dams and a casing. Clutch shaft 70 extends generally longitudinally from rearward portion 76 to forward portion 78 longitudinally parallel with axis of rotation 80 and includes radially extending portion 82 between rearward portion 76 and forward portion 78. As shown in FIG. 2, radially extending portion 82 extends in a radial direction from axis of rotation 80 from rearward portion 76 to forward portion 78 of clutch shaft 70. In the embodiment shown in FIG. 2, radially extending portion 82 is angled relative to axis of rotation 80. In exemplary embodiments, radially extending portion 82 has angle between about 30° and about 60° relative to axis of rotation 80. In one embodiment, radially extending portion 82 has angle of about 45° relative to axis or rotation 80. In other embodiments, radially extending portion 82 can extend radially (perpendicularly) from rearward portion 76 to forward portion 78.

Bearings 72 allow clutch shaft 70 to rotate within air turbine starter 40. In exemplary embodiments, clutch assembly 64 is a sprag (freewheel) clutch and bearings 72 allow disengagement of clutch shaft 70 from the driveshaft/gear train 60 of air turbine starter 40. In alternate embodiments, bearings 72 are rolling-element bearings such as roller bearings or ball bearings. Clutch oil supply (first) passage 74 is located on clutch shaft 70 and allows communication between internal cavity 84 and bearings 72 and other components of clutch assembly 64. Internal cavity 84 is disposed within clutch shaft 70 and bounded by the inner surfaces of clutch shaft 70. During operation, lubricating oil present in internal cavity 82 can flow from internal cavity 84 through clutch oil supply passages 74 to provide lubricating oil to bearings 72 and other clutch assembly and air turbine starter components outside of clutch shaft 70. Centrifugal forces resulting from the rotation of clutch shaft 70 encourage lubricating oil to flow away from internal cavity 84 and through clutch oil supply passages 74.

Output shaft assembly 66 includes output shaft 42, vent outlet 88 and a mounting flange for mounting output shaft assembly 66 to gearbox 38. Output shaft 42 mates with clutch shaft 70. In the embodiment shown in FIG. 2, external spline 92 on output shaft 42 interacts with internal spline 94 on clutch shaft 70 to form spline joint 96. Alternatively, output shaft 42 and clutch shaft 70 can be joined together using other mating configurations. Vent outlet 88 extends through output shaft 42 and connects vent plug 68 to air turbine starter pad cavity 98. Air turbine starter pad cavity 98 is an axial space between air turbine starter 40 and the gearbox to which it is mounted. Air turbine starter pad cavity 98 is an enclosed cavity between seals of air turbine starter 40 and the gearbox. Air turbine starter pad cavity 98 contains vents to communicate with air outside of cavity 98. Through vent plug 68, vent outlet 88 and air turbine starter pad cavity 98, the pressure inside internal cavity 84 stays near atmospheric levels by venting to outside air.

Vent plug 68 is a fitting connected to output shaft 42 that communicates with internal cavity 84 and vent outlet 88. In the embodiment shown in FIG. 2, vent plug 68 is a T-shaped fitting having radial passage 100 and axial passage 102. Radial passage 100 opens into internal cavity 84. Axial passage 102 is connected to vent outlet 88 within output shaft 42. Radial passage 100 and axial passage 102 connect within vent plug 68, thereby forming a fluid pathway between internal cavity 84 and air turbine starter pad cavity 98. In exemplary embodiments, vent plug 68 is connected to output shaft 42 by threads or another fastener. Alternatively, vent plug 68 can be interference fit with output shaft 42. In exemplary embodiments, vent plug 68 includes two or more radial passages 100 that open into internal cavity 84.

Various pumps, valves and conduits can be used to deliver lubricating oil throughout air turbine starter 40. Lubricating oil is introduced into internal cavity 84 through oil nozzle 106. Oil nozzle 106 is positioned aft of rearward portion 76 of clutch shaft 70. Lubricating oil is propelled or directed from oil nozzle 106 into internal cavity 84 where it lubricates clutch shaft 70 and spline joint 96 and passes through clutch oil supply passage 74 to lubricate bearings 72 and other components of clutch assembly 64.

Figure 2A:
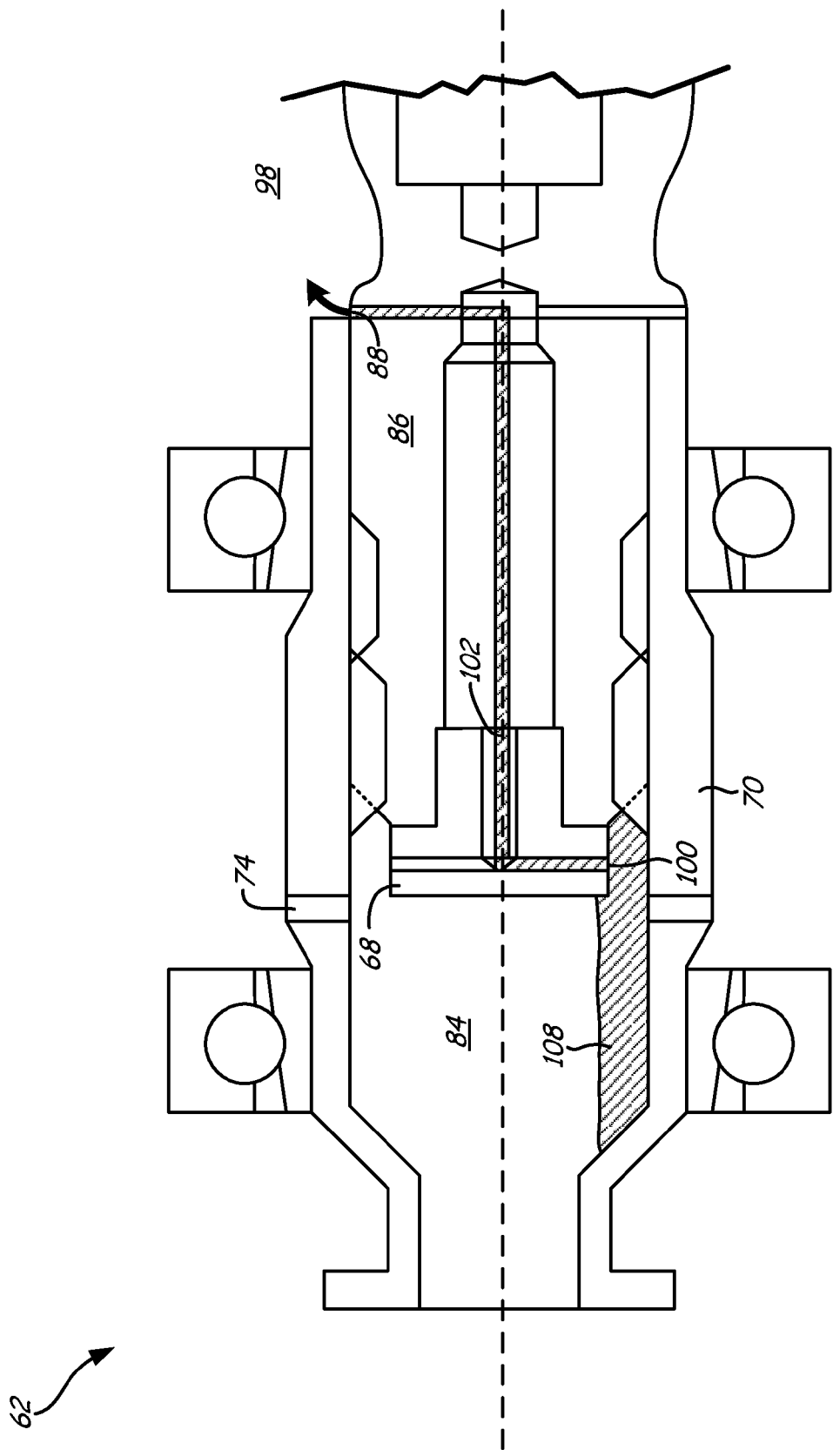
FIG. 2A is a cross-section view of the output section of an air turbine starter in which oil interferes with venting.

For the purposes of illustration, FIG. 2A shows a view of a cross-section of output section 62 of air turbine starter 40 in which oil is interfering with the venting of internal cavity 84. Lubricating oil inside internal cavity 84 has the potential to interfere with the venting of air turbine starter 40 in certain circumstances. For example, when operation of air turbine starter 40 is initiated in a cold climate (e.g., −40° C.), oil present within internal cavity 84 can be viscous or even solid due to the low temperature of the oil. At air turbine starter 40 start-up, the rotation speed of clutch shaft 70 and output shaft 42 can be fairly low (e.g., about 3,000 rpm). Under these conditions, lubricating oil in internal cavity 84 migrates fore and aft, but does not readily flow through clutch oil supply passage 74 as the centrifugal forces generated by shaft rotation are not of sufficient magnitude to overcome the viscosity of the oil. The increased viscosity of the oil discourages oil flow through clutch oil supply passage 74. As a result, lubricating oil forms an oil annulus (indicated by reference numeral 108) along the inner surface of clutch shaft 70. As additional oil accumulates in internal cavity 84, the depth of oil annulus 108 increases (i.e. oil annulus 108 expands farther towards the center of internal cavity 84). Eventually, the expanding oil annulus reaches radial passage 100 of vent plug 68. As the fluids (i.e. air and oil) in internal cavity 84 increase in temperature, further expanding oil annulus 108, pressure within internal cavity 84 increases. Due to the pressure increase, lubricating oil in oil annulus 108 near radial passage 100 is driven into radial passage 100 during venting and from there into axial passage 102, vent outlet 88 and air turbine starter pad cavity 98. This oil can both interfere with proper venting of internal cavity 84 as well as cause oil to leak from air turbine starter 40 into air turbine starter pad cavity 98 and to the external environment. This also reduces the amount of oil remaining in air turbine starter 40, limiting the number of operations or missions between maintenance intervals.

Figure 2B:
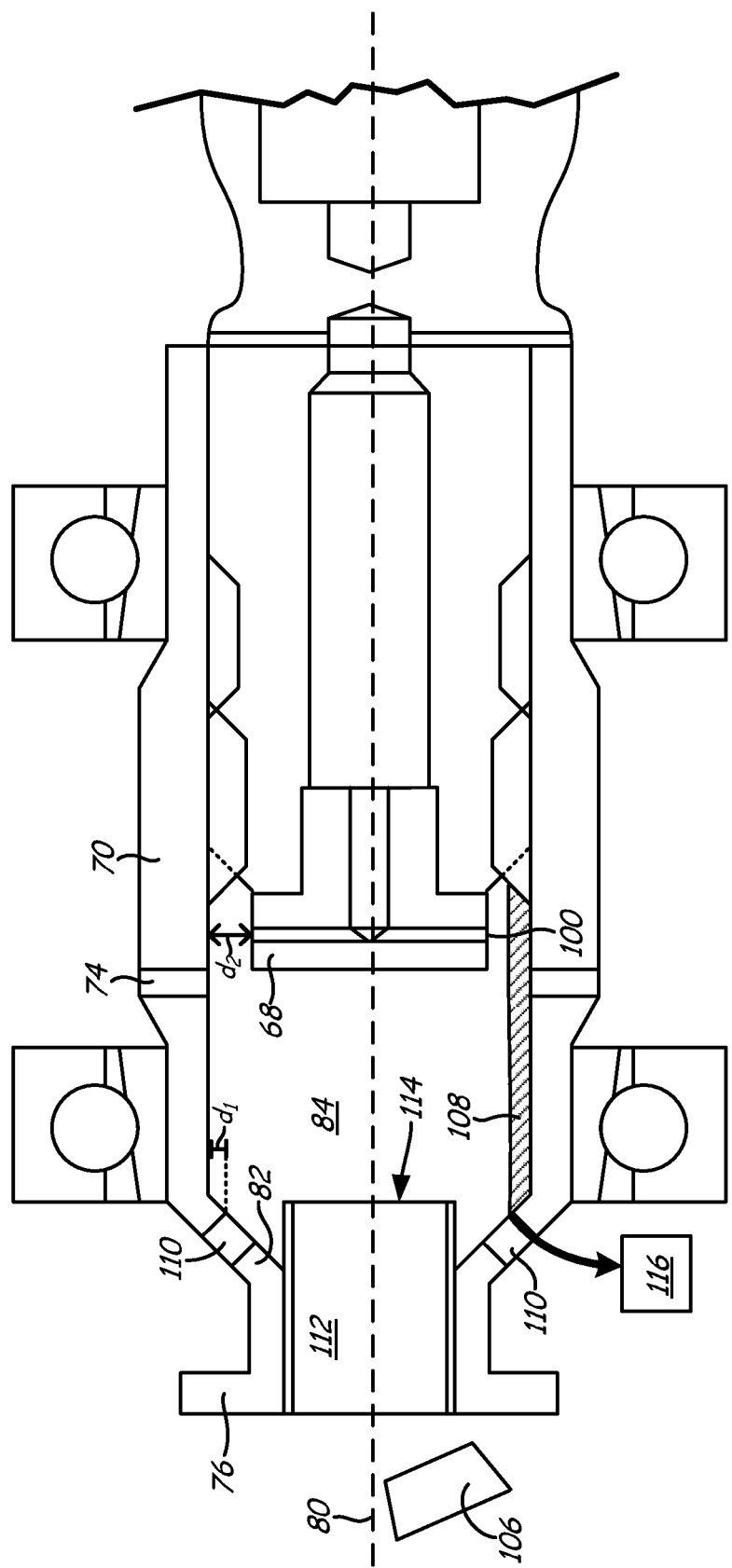
FIG. 2B is a cross-section view of the output section of an air turbine starter having excess oil drainage passages and an oil guide sleeve.

To prevent or reduce the potential of oil entering radial passage 100 of vent plug 68, one or more excess oil drainage (second) passages 110 and oil guide sleeve 112 are employed. FIG. 2B illustrates a cross-section view of output section 62 of air turbine starter 40 having excess oil drainage passages 110 and oil guide sleeve 112. Excess oil drainage passages 110 and oil guide sleeve 112 work cooperatively to prevent oil within internal cavity 84 from interfering with the venting function of vent plug 68 and exiting air turbine starter 40. Excess oil drainage passages 110 are located on clutch shaft 70 to provide outlets for excess oil within internal cavity 84. In exemplary embodiments, excess oil drainage passages 110 are located on radially extending portion 82. Excess oil drainage passages 110 are positioned on clutch shaft 70 so that at least a portion of each excess oil drainage passage 110 is radially outward of radial passage 100 of vent plug 68. As shown in FIG. 2B, $d_1$ illustrates the distance from the inner surface of clutch shaft 70 to a radially outward portion of excess oil drainage passage 110, and $d_2$ illustrates the distance from the inner surface of clutch shaft 70 to radial passage 100. Distance $d_1$ is smaller than distance $d_2$ allowing oil to drain through excess oil drainage passages 110 so that excess oil is prevented from reaching radial passage 100. By positioning excess oil drainage passages 110 radially outward of radial passage 100, excess oil drains from internal cavity 84 through excess oil drainage passages 110 so that oil annulus 108 does not expand to a depth ($d_2$) that would cover radial passage 100 and interfere with venting. During rotation, oil within internal cavity 84 forms an oil annulus having a generally uniform thickness along the inner surface of clutch shaft 70 due to the centrifugal forces generated by rotation. Oil annulus 108 is generally distributed circumferentially in internal cavity 84 while clutch shaft 70 is rotating. Oil having a depth greater than distance $d_1$ reaches excess oil drainage passages 110 and exits internal cavity 84 so that excess oil is prevented from reaching radial passage 100.

As shown in FIG. 2B, excess oil drainage passages 110 can be located on radially extending portion 82 of clutch shaft 70. By locating excess oil drainage passages 110 on radially extending portion 82, excess oil drainage passages 110 can be positioned radially outward of radial passage 100. Excess oil drainage passages 110 can be angled relative to axis of rotation 80. In exemplary embodiments, excess oil drainage passages 110 have angle between about 30° and about 60° relative to axis of rotation 80. In one embodiment, excess oil drainage passages 110 have angle of about 45° relative to axis of rotation 80. Between two and about eight excess oil drainage passages 110 are located along the circumference of clutch shaft 70. Exemplary embodiments contain between about six and about eight excess oil drainage passages 110.

Lubricating oil passes through oil guide sleeve 112 in order to enter internal cavity 84. Oil guide sleeve 112 is positioned near rearward portion 76 of clutch shaft 70. Forward portion 114 of oil guide sleeve 112 extends forward from rearward portion 76 into internal cavity 84. Oil guide sleeve 112 prevents oil introduced into internal cavity 84 from exiting through excess oil drainage passages 110 before the oil has the opportunity to provide lubrication to clutch shaft 70, spline joint 96 or other components requiring lubrication. Without oil guide sleeve 112, a substantial quantity of oil introduced by oil nozzle 106 would simply exit internal cavity 84 through excess oil drainage passages 110 without providing significant lubrication. Forward portion 114 of oil guide sleeve 112 extends forward beyond excess oil drainage passages 110 (in a direction towards vent plug 68). By positioning forward portion 114 axially forward of excess oil drainage passages 110, oil distributed by oil nozzle 106 will contact the inner surface of clutch shaft 70 and provide some measure of lubrication before migrating and reaching excess oil drainage passages 110.

In one exemplary embodiment, oil guide sleeve 112 is interference fit with rearward portion 76 of clutch shaft 70. In another exemplary embodiment, oil guide sleeve 112 is swaged into position within rearward portion 76 of clutch shaft 70. In alternative embodiments, other fastening means are used to position and set oil guide sleeve 112 within rearward portion 76 of clutch shaft 70 including brazing, welding, thread, adhesives and combinations thereof.

Oil passing through excess oil drainage passages 110 enters other cavities of air turbine starter 40. This removed oil can be used to lubricate other components directly or be collected and redistributed by oil nozzle 106 or other lubrication systems within air turbine starter 40. In exemplary embodiments, air turbine starter 40 includes oil redistribution system, represented in FIG. 2B by reference numeral 116. Oil that exits internal cavity 84 through excess oil drainage passages 110 is collected by oil redistribution system 116 and repurposed within air turbine starter 40. Oil redistribution system 116 can contain various pumps, valves, conduits and collection vessels for collecting and redistributing lubricating oil throughout air turbine starter 40, including redirecting collected oil through oil nozzle 106.

Figure 3:
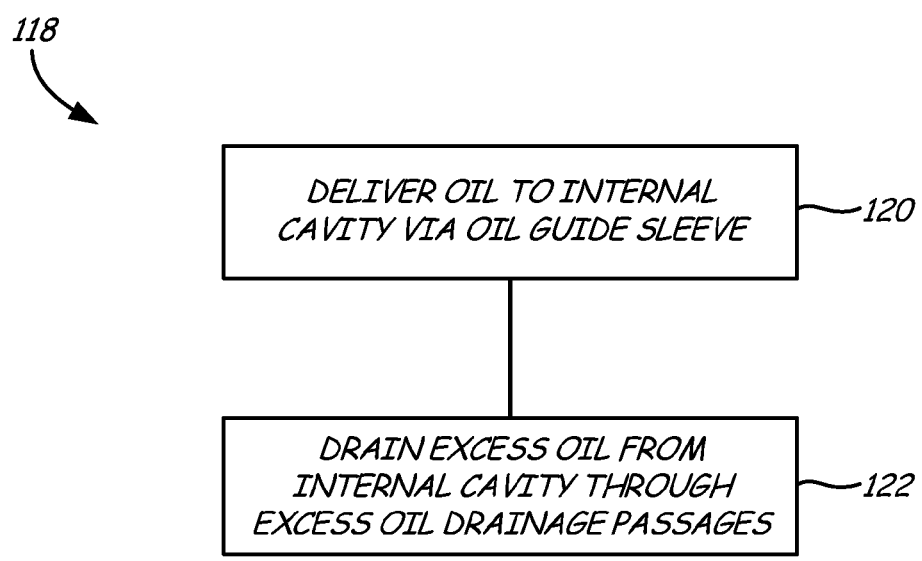
FIG. 3 is a simplified flow diagram of a method for lubricating and venting an air turbine starter.

The present invention also provides a method for lubricating and venting an air turbine starter. FIG. 3 illustrates a simplified flow diagram of a method for lubricating and venting an air turbine starter. Method 118 includes delivering lubricating oil to an internal cavity of a clutch via an oil guide sleeve to lubricate clutch components (step 120). Oil guide sleeve 112 prevents oil from immediately exiting internal cavity 84 through excess oil drainage passages 110, thereby lowering or eliminating the lubrication of clutch components. Method 118 also includes draining excess oil from the internal cavity through the excess oil drainage passages so that excess oil does not substantially impede air flow through a vent plug passage (step 122). Excess oil drainage passages 110 are positioned so that at least a portion of each passage 110 is radially outward of radial passage 100 of vent plug 68.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A clutch assembly comprising:
   a shaft comprising:
     an internal cavity;
     first passages in the shaft for allowing oil to exit the internal cavity to lubricate clutch components; and
     a second passage in the shaft for allowing excess oil to drain from the internal cavity;
   a vent plug having a passage with a radially facing outlet in communication with the internal cavity for venting the internal cavity with a source of air external to the internal cavity; and
   an oil guide sleeve for directing oil into the internal cavity.

2. The clutch assembly of claim 1, wherein the oil guide sleeve comprises a forward portion extending in a longitudinal direction beyond the second passage in the shaft.

3. The clutch assembly of claim 1, wherein the oil guide sleeve prevents oil entering the internal cavity from exiting through the second passage in the shaft before contacting a portion of the shaft forward of the second passage.

4. The clutch assembly of claim 1, wherein the second passage is positioned at an angle between 30° and 60° relative to an axis of rotation of the shaft.

5. The clutch assembly of claim 1, wherein the second passage is positioned on the shaft so that at least a portion of the second passage is radially outward of the radial passage of the vent plug.

6. The clutch assembly of claim 1, wherein the shaft comprises between two and eight second passages.

7. An air turbine starter comprising:
   a clutch comprising:
     a shaft;
     bearings;
     an internal cavity disposed within the shaft;
     first passages in the shaft for allowing oil to exit the internal cavity to lubricate air turbine starter components; and
     second passages in the shaft for allowing excess oil to drain from the internal cavity of the clutch;
   an oil nozzle in communication with the internal cavity;
   a vent plug having a radial passage;
   an output shaft assembly engaged with the clutch shaft, the output shaft assembly comprising:
     an output shaft; and
     a vent outlet in communication with the vent plug for venting the internal cavity of the clutch with a source of air external to the internal cavity; and
   an oil guide sleeve for directing oil delivered by the oil nozzle to the clutch shaft.

8. The air turbine starter of claim 7, wherein the oil guide sleeve comprises a forward portion extending in a longitudinal direction beyond the second passages.

9. The air turbine starter of claim 7, wherein the oil guide sleeve prevents oil entering through the oil inlet from exiting through the second passages before contacting a portion of the clutch shaft forward of the second passages.

10. The air turbine starter of claim 7, wherein the second passages are positioned at an angle of about 45° relative to an axis of rotation of the shaft.

11. The air turbine starter of claim 7, wherein the second passages are positioned on the clutch shaft so that at least a portion of each second passage is radially outward of the vent plug radial passage.

12. The air turbine starter of claim 7, wherein the second passages are positioned forward of the oil nozzle, rearward of the vent plug and rearward of the first passages.

13. The air turbine starter of claim 7, wherein the vent plug is a T-shaped fitting having a radial passage in communication with the internal cavity of the shaft and an axial passage in communication with the vent outlet of the output shaft assembly.

14. The air turbine starter of claim 7, wherein the oil guide sleeve is interference fit or swaged with the clutch shaft.

15. The air turbine starter of claim 7, wherein the oil guide sleeve is fastened to the clutch shaft by brazing, welding, thread, adhesive or combinations thereof.

16. The air turbine starter of claim 7, further comprising:
   an oil redistribution system for collecting oil drained from the internal cavity of the shaft through the second passages and recirculating the collected oil to the air turbine starter.

17. A method for lubricating and venting an air turbine starter, the method comprising:
   delivering lubricating oil to an internal cavity of a clutch via an oil guide sleeve to lubricate clutch components, wherein the oil guide sleeve prevents oil from exiting the internal cavity through excess oil drainage passages before it lubricates the clutch components; and
   draining excess oil from the internal cavity through the excess oil drainage passages so that excess oil does not substantially impede air flow through a vent plug passage having a radially facing outlet, wherein the excess oil drainage passages are positioned so that at least a portion of each passage is radially outward of the radially facing outlet of the vent plug.

18. The method of claim 17, wherein the oil guide sleeve is positioned to prevent oil from exiting through the excess oil drainage passages before contacting a portion of the clutch forward of the excess oil drainage passages.

19. The method of claim 17, wherein the oil guide sleeve is interference fit or swaged with a rear portion of the clutch.

20. The air turbine starter of claim 7, wherein the second passages are positioned at an angle between 30° and 60° relative to an axis of rotation of the shaft.

* * * * *